Figure 1:
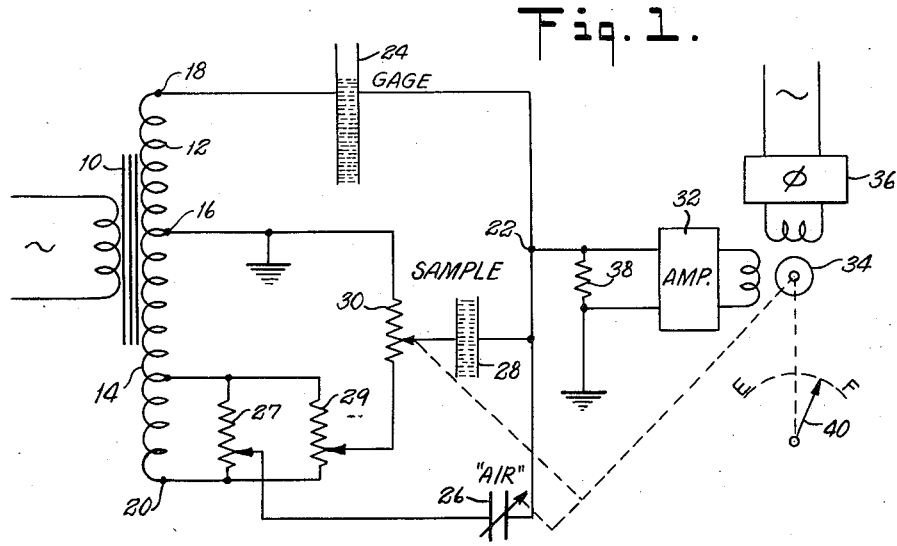

Jan. 6, 1959

C. R. SCHAFER 2,867,120

COMPENSATED FUEL GAGE BRIDGE

Original Filed Sept. 9, 1950

2 Sheets-Sheet 1

INVENTOR.
Curtiss R. Schafer
BY Robert S. Dunham
ATTORNEY

Jan. 6, 1959 C. R. SCHAFER 2,867,120
COMPENSATED FUEL GAGE BRIDGE
Original Filed Sept. 9, 1950 2 Sheets-Sheet 2

INVENTOR.
Curtiss R. Schafer
BY Robert S. Dunham
ATTORNEY

United States Patent Office 2,867,120
Patented Jan. 6, 1959

2,867,120

COMPENSATED FUEL GAGE BRIDGE

Curtiss R. Schafer, Westport, Conn., assignor to The Liquidometer Corporation, Long Island City, N. Y., a corporation of Delaware Continuation of application Serial No. 183,966, September 9, 1950. This application September 21, 1956, Serial No. 611,278

19 Claims. (Cl. 73—304)

The present invention relates to electrical gages or gaging systems for providing an indication of liquid level and, more particularly, the invention relates to electrical fuel gages in which the indication is provided at a point remote from the vessel or tank containing the fuel.

The present application is a continuation of application Serial No. 183,966, filed September 9, 1950, entitled Compensated Fuel Gage Bridge, and assigned to the same assignee as the present application, which application is now abandoned.

Electrical gages are already known in which a form of bridge or like network is used, incorporating a pair of gaging capacitor plates in the liquid, the level of which is to be measured. The liquid constitutes a dielectric that increases the capacitance of the gaging capacitor when full; and as the liquid level drops, the decreasing immersion of the plates produces a related decrease of capacitance. In a bridge, this decrease produces an unbalance and, by means of another adjustable capacitor and a servo-amplifier, the bridge balance is restored, roughly. A corresponding indication of capacitance of the gaging capacitor is also obtained, reading directly in liquid units or in fractions of a full tank.

The primary use for which the present invention is intended is for the gaging of liquid hydro-carbon fuels, as in aircraft, and for convenience the remainder of this specification will refer to such fuel. It will of course be understood that the invention is generally applicable to use with other liquids.

When the plates of the gaging capacitor are immersed in fuel such as gasoline, there is not only a change in capacitance but a degree of loss is also introduced in the capacitor that is accompanied by a real component of bridge unbalance that is in quadrature to the capacitive unbalance. The servomotor can be made responsive to either the capacitive unbalance or to the resistive unbalance so as to restore balance of the bridge for either of these factors. However, when the known form of bridge is balanced for one factor, it is subject to a substantial quadrature unbalance voltage. This decreases the sensitivity of the servo-amplifier that detects and utilizes the unbalance voltage output of this bridge for causing the motor to rebalance it. Furthermore, as different charges of fuel vary in respect to loss factor and dielectric constant, it has heretofore been necessary to readjust the bridge for each charge of fuel.

In the present invention a liquid level gaging system is provided wherein automatic balancing of the bridge is achieved for both the capacitive component and the resistive component of unbalance produced by changing liquid level. In another aspect, the present invention provides simple and effective systems for automatically establishing balance or compensation and uniform calibration from "empty" to "full" despite variations, from one fill of fuel to the next, in dielectric and loss factors.

As will appear in further detail, one embodiment of this invention includes a gaging capacitor in one arm of an alternating current bridge, and a sampling capacitor is included in another arm of the bridge; and a third capacitor of ideally zero loss factor is included in the bridge in such fashion as to compensate for changes in the exposed portion of the gaging or gage capacitor as the liquid level changes.

In a further aspect the invention provides a combined unit incorporating the gage and sampling capacitors. The preferred form of this combined unit is of a particular construction that is suited to certain forms of bridge embodying further aspects of the invention. This preferred combined unit includes a succession of nested, mutually spaced, metal containers serving as plates of the gaging and sampling capacitors; and an intermediate one of these metal containers constitutes a common plate of both capacitors. This common plate container also constitutes an unbalance output terminal of the bridge or self-balancing fuel-gage network.

Figure 2:
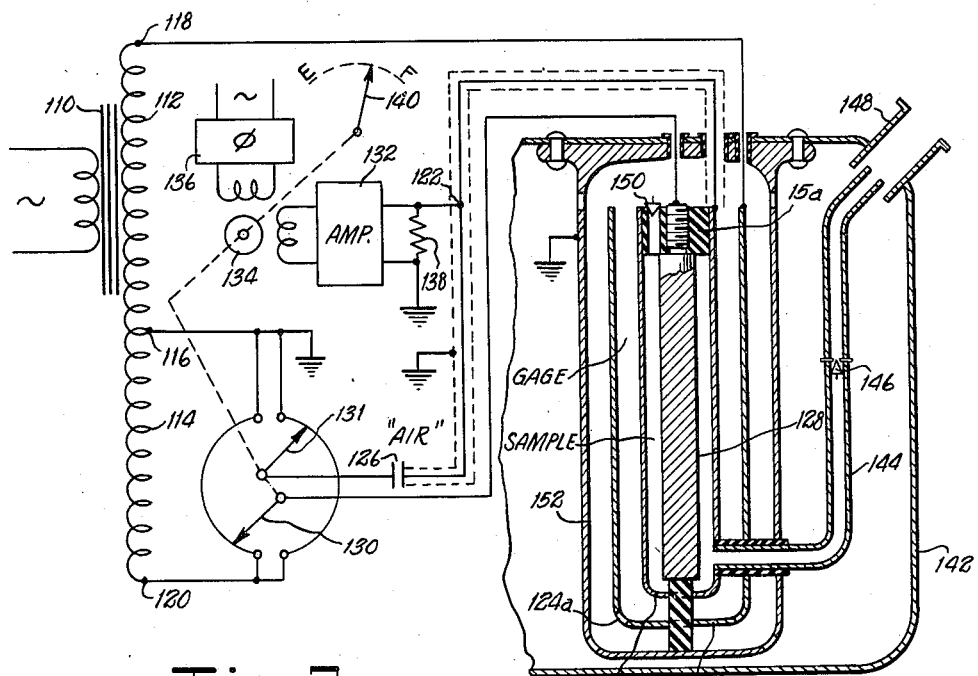
Figure 3:
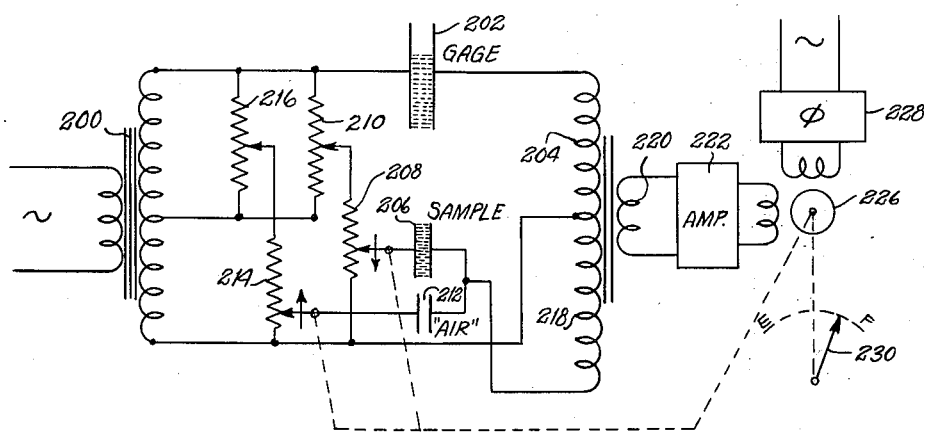
Figure 4:
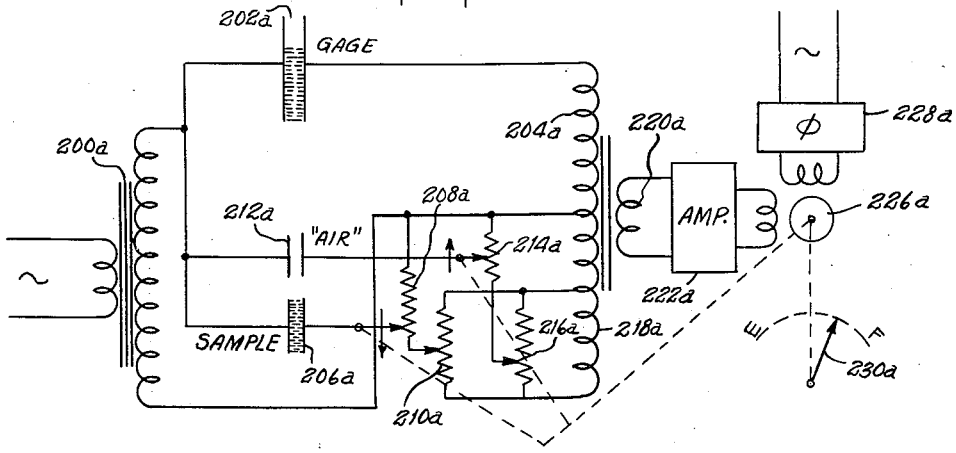

The foregoing broad aspects of the invention will be better appreciated and further features of novelty will appear from the following detailed description of several illustrative embodiments shown in the accompanying drawings wherein:

Figs. 1, 3 and 4 are circuit diagrams of several embodiments of the invention and Fig. 2 is a circuit diagram of a self-balancing fuel-gaging bridge connected to a combined gaging and sampling capacitor shown in cross-section. Referring now to Fig. 1, an alternating current bridge is shown including a transformer 10 having a secondary winding comprised of a first winding section 12 and a second winding section 14 joined together at a conjugate-point tap 16 comprising one output or unbalance terminal of the bridge. Between one bridge-energizing terminal 18 of winding 12 and the opposite bridge-energizing terminal 20 of winding 14 there are connected three arms or branches of the bridge. In effect, the secondary winding 12, 14 comprises a bridge impedance having a first impedance section 12 included in one bridge branch and a second impedance section 14 included in common in two other bridge branches, the terminals 18 and 20 then constituting alternating energized potential diametric conjugate points of the bridge. The arms last mentioned are joined at common terminal 22 which constitutes with the terminal 16 a second pair of output diametric conjugate points of the bridge. One arm of the bridge extends between terminals 22 and 18 and includes the gaging capacitor 24 which is identified in Fig. 1 simply as "Gage." Two other arms or branches of the bridge are provided between terminals 20 and 22. One of these includes a high-Q capacitor 26 (having a low-loss dielectric and thereby low-loss factor) advantageously having air or mica as its dielectric, and identified in the drawing with the label "Air." The other branch circuit includes the sampling capacitor 28, labeled "Sample." These branch circuits include trimmer potential dividers 27 and 29, for respectively establishing bridge balance at "Empty" and at "Full."

Means are provided for adjusting the relative currents transmitted by both branches, the "Sample" and the "Air" capacitors, so as to balance the current of the "Gage" capacitor in the opposite arm of the bridge, irrespective of the level of the liquid. The air capacitor 26 is made adjustable in the form of Fig. 1, and the sample capacitor 28 is arranged to pass a variable amount of current (including both capacitive and loss-factor components) by virtue of a resistive potentiometer 30 or equivalent adjustable-potential device. An amplifier 32 is energized at its input by the bridge unbalance at terminals 16 and 22. This amplifier energizes one winding of a two-phase motor 34 that is mechanically coupled to both potentiometer 30 and adjustable capacitor 26. The other motor winding is energized from the same source as that of transformer 10 through a phase-adjusting unit 36 that makes motor 34 responsive either to the real or to the reactive component of the unbalance voltage, as may be desired.

The bridge may now be considered with Gage capacitor 24 fully immersed, and "Air" capacitor 26 in its minimum, virtually open-circuited adjustment. When proportioned for balance, the capacitance of unit 24 is to the capacitance of unit 28 as section 14 of the transformer is to section 12. This relationship does not depend upon the dielectric constant of the fuel but depends only on the geometry of the capacitors. Potentiometers 27 and 29 correct for departure from these ideals.

The presence of the dielectric in the capacitors multiplies the capacitance of both units by the same factor. In like sense, a change in dielectric constant of the fuel from one filling to the next does not affect the ratio of the two capacitances and hence the bridge remains balanced despite changes in dielectric constant of the fuel. Assuming the bridge to be balanced for capacitive reactances, this balance remains despite changes of dielectric constant.

Dielectric constant also changes for a single filling under varying conditions of temperature. The proportionality remains proper despite these changes and the indication remains accurate.

The fuel has a resistivity that produces very substantial leakage currents and should be taken into account. However, the ratio of the leakage resistance of unit 24 to that of unit 28 depends upon the geometry of the units in the same way that the capacitance ratio depends upon the same geometry. A rise of dielectric constant increases the current in both Gage and Sample units and, similarly, a drop in resistivity increases the loss current in both units. Thus, when a bridge is balanced for one fuel with capacitor 24 fully immersed, the bridge will remain balanced for other fuels that may differ in dielectric constant or resistivity, or both.

The proportionality of the bridge impedances when the bridge is adjusted to "full" may be demonstrated by the following expression to be invariable despite variations of dielectric constant of the fuel and of resistivity of the fuel:

$$\frac{E_{12}}{E_{14}} = \frac{X_{cg}}{X_{cs}} = \frac{kC_s}{kC_g} = \frac{rR_g}{rR_s}$$

In the foregoing expression $E_{12}$ and $E_{14}$ are the voltages of sections 12 and 14 of transformer 10; $X_{cg}$ and $X_{cs}$ are the capacitive reactances of the gage and sample units, respectively; $C_g$ and $C_s$ are the air capacitances of the gage and sample units, respectively; $R_g$ and $R_s$ are resistance factors of the Gage and Sample units that depend upon the geometry of those units, and $k$ and $r$ are the dielectric constant and the resistivity of the fuel. It is seen from the equation that the equality remains despite variations of $k$ and variations of $r$. The balance of the bridge of Fig. 1 is maintained for fluids of various dielectric constants and various resistivities.

It will be observed that the amplifier has an input resistor 38, the value of which need not be especially high. Under conditions of unbalance this resistor may carry a substantial part of the current of either arm of the bridge and thus it affects the bridge so long as unbalance voltage exists. If the resistance is too low, the bridge sensitivity suffers. However, when the bridge is balanced, there is no voltage across this resistor and, in consequence, the value of the resistor does not affect the ratio of the bridge arms and does not affect the balance point. By like reasoning, the input capacitance of the amplifier, if moderate, has only a minor effect on the bridge sensitivity but does not affect the balance point.

The bridge may be now considered with potentiometer 30 adjusted to impress no voltage on sample capacitor 28. In this condition the sample capacitor amounts to a shunt on resistor 38 and thus affects the bridge sensitivity somewhat, but insofar as bridge balance is concerned, it is ineffectual. At this time the gaging capacitor extends fully out of the fuel as when the tank is "Empty." The bridge can then be rebalanced by properly choosing the capacitance of "Air" or high-Q capacitor 26, and adjusting trimmer 27.

Potentiometer 30 can be adjusted for partial immersion of gaging capacitor 24. The setting of potentiometer 30 is adjusted so that a fraction of the voltage of winding 14 is applied to unit 28 corresponding to the fraction of Gage capacitor 24 that is immersed. This setting establishes bridge balance in respect to the resistivity factor. However, the capacitance of unit 24 does not diminish in direct ratio with the resistance, in proportion to the ebbing fuel, because the portion of the gaging capacitor above the fuel level remains as an air capacitor. This is balanced by adjusting capacitor 26.

Potentiometer 30 and capacitor 26 are ganged mechanically and to indicator 40. This potentiometer and the Air capacitor have characteristics that satisfy the intermediate condition just described for all intermediate levels.

The two-phase motor 34 with its phaser 36 is, broadly, illustrative because a voltage-responsive polarity-insensitive motor can also be used in its place. For example, a direct-current motor can be used that is energized by the rectified output of amplifier 32. The two-phase motor has the advantage, however, that it can be made to be responsive to the resistive component of unbalance alone, which is more sensitive than an arrangement responsive to the capacitive unbalance component or to the combined components of unbalance voltage, suitably amplified. To make motor 34 responsive to the resistive unbalance component, phaser 36 is adjusted to provide a voltage input shifted 90 degrees with respect to the input of transformer 10.

The bridge is balanced because capacitors 26 and 28 together provide current contributions which equal the phase and magnitude of the current through capacitor 24. The Sample capacitor contributes all of the resistive component needed, but both together provide the necessary reactive current.

In the form of fuel gage system in Fig. 2, a transformer 110, having secondary windings 112 and 114, provides unbalance output terminal 116 for a bridge having energizing terminals 118 and 120. A gaging capacitor including an outer cup 124 and an inner cup 125 as capacitor plates is connected between energizing terminal 118 and unbalance terminal 122 of the bridge. A sampling capacitor having plates in the form of the cup 125 and an inner rod 128, and an "Air" capacitor 126, are branch circuits of the bridge arm between terminals 122 and 120. A dual potentiometer 130, 131 separately energizes the sampling capacitor and the "Air" capacitor in reverse proportionality so that when the voltage on the sampling capacitor is a maximum, the voltage on the air capacitor is zero, and when the voltage on the "Air" capacitor is a maximum, that on the sampling capacitor is zero. For intermediate positions the current contributions of the branch circuits containing the fixed "Air" capacitor and the fixed sampling capacitor are varied, so that the total contributions of both branches match the gaging-capacitor current in real and reactive components. Amplifier 132 energized by the bridge unbalance voltage energizes one phase of two-phase servomotor 134. The other phase winding of this motor has a phaser 136 that advantageously is adjusted to make the motor responsive only to the real or resistive component of the bridge unbalance. The automatic balancing of the bridge for the other component prevents overload and thus insures high amplifier sensitivity. An indicator 140 reading directly in liquid units or in fractions of a full tank is ganged to dual potentiometer 130—131 so as to be operated conjointly by motor 134 at a point remote from the combined gaging and sampling unit.

The operation of the bridge in Fig. 2 is broadly the same as that of the bridge in Fig. 1. Sampling capacitor 125—128 has a variable voltage applied to it by a potentiometer which is a direct function of the gaging liquid level; and in this instance because the "Air" capacitor is fixed, a second potentiometer varies the "Air"-unit current by means of a variable voltage input rather than by varying the "Air" capacitor itself as in Fig. 1. The voltage input to the "Air" capacitor is a direct function of the exposed fraction of the gaging capacitor. The embodiment of Fig. 2 utilizes varying applied voltage for the "Air" capacitor and the sampling capacitor. In both figures, there is the common characteristic of inversely varying degrees of current contribution from the sampling capacitor and the "Air" capacitor as the liquid level changes, the "Sample" unit matching the complex current of the immersed part of the gaging capacitor, and the "Air" capacitor matching the current of the exposed fraction of the gaging capacitor.

Various refinements of the circuit of Fig. 2, such as trimmers and the like usualy used in such circuits, are not shown since they will be self-evident to those skilled in the art.

The combined gaging and sampling unit for the fuel tank as illustrated in Fig. 2 includes a cup 124 that extends from the bottom of the tank 142 to the top. A supply tube 144 (that includes a check valve 146 for retaining a full charge in the sample section) extends to the input line 148 of the gas tank. A check valve 150 is also included at the top of the sampling unit structure, and the arrangement thus far described provides for automatic substitution of the fuel in the sampling unit between rod 128 and cup 125 each time that the tank is refilled. The fuel that leaves the sampling unit flows into the gaging unit constituted of cups 124 and 125, and the fuel that may have occupied that unit is allowed to escape and circulate via one or more holes 124a. A perforated shield 152 encloses and supports the combined gaging and sampling capacitor assembly. This shield is electrically grounded (connected to terminal 116) so that the capacitance of the shield to cup 124 is simply a capacitive shunt from terminal 116 to 118 and of no effect. The lead from the common cup 125 of both the gaging and sampling units, which is connected to terminal 122 of the bridge, is also shielded, and this shield is grounded. A small amount of shunt capacitance on the amplifier input results, and this capacitance affects the sensitivity of the bridge somewhat, but does not affect the null of the gaging system.

In Figures 3 and 4 there are shown two other embodiments of the broad aspects of this invention, which may however be less desirable because of an additional transformer shown. Replacing the tapped input transformer of Figures 1 and 2, a tapped output transformer is used; and although an input transformer is shown, that is a practical consideration rather than an essential one.

Alternating current transformer 200 energizes gaging capacitor 202 in series with one section 204 of an output transformer. Transformer 200 also energizes "Sample" capacitor 206 through potentiometer 208 and voltage trimmer 210, and transformer 200 further energizes "Air" capacitor 212 through potentiometer 214 and voltage trimmer 216. The branch "Air" and "Sample" capacitor circuits jointly contribute to the current in this return circuit to transformer 200 through winding 218 that is connected in phase-opposition to winding 204.

In this arrangement, the secondary winding of a transformer 200 has end terminals which provide the energized conjugate points of the alternating-current bridge. Connected between these conjugate points is a first bridge branch which includes the transformer primary winding section 204 in series with the gaging capacitor 202. Also connected between these energized conjugate points of the bridge are two additional bridge branches both of which include in common the primary winding section 218 and one additionally including the "Sample" capacitor 206 and potentiometer 208 and the other including the "Air" capacitor 212 and potentiometer 214. As thus arranged, the uncommon terminals of the transformer winding sections 204 and 218 constitute the second pair of diagonal conjugate points of the bridge from which it would be possible to receive a bridge unbalance output potential as in Fig. 1 arrangement in contrast to using as the bridge output the unbalance of currents appearing in winding sections 204 and 218 as particularly shown in Fig. 3.

The net effect of the combined currents of all the gaging capacitors is developed in the output winding 220, amplified in unit 222, and converted to self-balancing servo output by motor 226 that is coupled to potentiometers 208 and 214 for operation in the direction to maintain equal current flow through the transformer sections 204 and 218 and thereby maintain the amplifier input ideally at zero. Motor 226 is of the two-phase type for reasons discussed in connection with Figures 1 and 2, and has a phaser 228 and an indicator 230 for purposes there described.

The circuit of Fig. 4 will be described using subscript "a" numerals corresponding to those of Fig. 3, and is a transformation thereof to enable the physical gaging and sampling unit of Fig. 2 to be utilized.

Transformer 200a energizes gaging capacitor 202a through winding 204a. "Sample" capacitor 206a is energized through winding 218a, but only an adjustable portion of its current is fully effective in that winding because of trimmer 210a that spans part of the winding. Potentiometer 208a passes a variable fraction of this "Sample" capacitor current through the winding 218a. Similarly, the effective current of "Air" capacitor 212a in winding 218a is adjusted by trimmer 216a and varied by potentiometer 214a. The combined net output of opposed windings 204a and 218a is resolved in winding 220a to energize amplifier 222a and one winding of two-phase servo-motor 226a that is mechanically coupled to potentiometers 208a and 214a and to indicator 230a. The second winding of motor 226a has a phaser 228a, the purpose and adjustment of which will be obvious from the previous descriptions. It will be noted that the bridge arrangement of Fig. 4 is essentially the same as that of Fig. 3. Whereas in Fig. 3 the relative magnitudes of the two bridge branch currents which flow through the transformer winding section 218 are governed by the adjustments of the potential divider potentiometers 208 and 214 in varying the magnitudes of the energizing voltages applied to the respective capacitors 206 and 212, in Fig. 4 the potentiometers 208a and 214a operate as current dividers to vary by their individual adjustments the fraction of each capacitor 206a and 212a current which is permitted to flow through the transformer winding section 218a as just explained.

The foregoing illustrative disclosure will be recognized by those skilled in the art as subject to a broad latitude of rearrangement and substitution, and will be found to possess varied applications; and in consequence it is appropriate that the appended claims should be accorded a broad scope, consistent with the spirit of the invention.

What is claimed is:

1. A liquid level gaging system including an alternating current bridge having alternating current energizing means and an unbalance detector, two adjoining arms of said bridge having gaging and sampling capacitors therein, said capacitors being an assembly adapted to be disposed in a tank whose liquid level is to be gaged, said assembly including a set of three concentric electrodes insulated each from the others and including an outer pair of electrodes and an inner pair of electrodes with the middle electrode common to both pairs, one of said pairs of insulated electrodes being formed as a container with intake and overflow openings and having means connected to the intake opening to receive and retain a full charge of liquid when liquid is being charged into the tank, the other pair of insulated electrodes being disposed to extend throughout the range of liquid levels to be gaged and being formed as a container with openings at the top and bottom thereof exposed to the surrounding space of the tank so as to be variably filled in dependence on the level of liquid in the tank, an adjustable electrical control connected as an arm of the bridge and adapted to balance the sampling capacitor arm against the effect on the bridge of the current in the liquid-filled portion of the gaging capacitor arm, an adjustable circuit including a high-Q capacitor connected to said energizing means and to said common electrode and having adjustment means adapted to balance the bridge in respect to the effect of the current in the portion of the gaging capacitor that extends above the liquid level, said adjustable electrical control and said adjustment means and said high-Q capacitor being ganged for conjoint operation and being situated remote from said assembled gaging and sampling capacitors.

2. A liquid level gaging system, including a combined gaging and sampling device having a gaging capacitor having separate electrodes both extending from the lowest to the highest level in the range of liquid levels to be gaged and adapted to admit and release liquid to correspond to the liquid level to be gaged, a sampling capacitor including a pair of separate electrodes with the space therebetween adapted to be refilled when liquid is charged into the space about said gaging and sampling device and to retain each filling irrespective of variations in level of the liquid in the gaging capacitor, said capacitors having a common conductive wall constituting one electrode of each of said pairs of electrodes, circuit means including a three-terminal circuit device and a two-terminal circuit device connected to said combined gaging and sampling device so as to form therewith an alternating current bridge, one of said circuit devices constituting alternating-current supply means and the other of said devices constituting current-comparing means, said two-terminal circuit device being connected from said common wall to a terminal of said three-terminal device between the other two terminals thereof, means disposed remote from said combined gaging and sampling device for adjusting the current of said sampling capacitor in proportion to the current of the liquid-filled portion of said gaging capacitor, motor means controlled by said comparing means to operate said adjusting means to maintain a constant relationship between the current of said sampling capacitor and the current in the liquid-filled portion of said gaging capacitor, a further adjustable circuit disposed remote from said combined gaging and sampling device including a high-Q capacitor and having adjustment means operated by said motor means and arranged to maintain a predetermined bridge-balancing relationship between the current of the high-Q capacitor and the current in the exposed portion of said gaging capacitor, said adjustable circuit being connected to said alternating current supply means and to said current-comparing means, and a liquid-level indicator operated conjointly with said adjusting means by said motor means.

3. A liquid level gaging system, having a combined liquid gaging and sampling device embodying gaging and sampling capacitors having a common capacitor plate and a common circuit connector having a shield, said gaging capacitor including an insulated plate in addition to said common plate, both said plates extending from the lowest to the highest liquid level to be gaged and adapted to receive and maintain a level of liquid prevailing in the surrounding space, said sampling capacitor including a further insulated plate additional to said common plate and adapted to receive and retain a filling of a sample of said liquid irrespective of the liquid level in the gaging capacitor, alternating-current energizing and current comparing means having connections to said capacitors and therewith constituting an alternating-current bridge, one of said means having a reference terminal between additional terminals and said shield and one terminal of the other of said means being connected thereto, the other terminal of said other means being connected to said common circuit connector, said additional terminals being respectively connected to said insulated plates of said gaging and sampling capacitors, and means disposed remote from said combined gaging and sampling device for balancing the bridge, said means including a potentiometer for adjusting the current of said sampling capacitor in proportion to the level of liquid in said gaging capacitor and under control of said comparing means, said bridge-balancing means also including a high-Q capacitor and current adjustment means ganged to said potentiometer to be adjusted conjointly therewith and arranged to vary the current in the high-Q capacitor to balance the bridge in respect to variations of the current in the portion of the gaging capacitor above the level of the liquid.

4. A liquid level gaging system, having liquid level gaging and sampling capacitors, said gaging capacitor including a pair of separate insulated electrodes extending from the lowest to the highest liquid level to be gaged and adapted to receive and maintain between them the same level of liquid that prevails in the surrounding space, said sampling capacitor including a pair of separate insulated electrodes fixed relative to each other and adapted to have the space therebetween filled and to remain filled irrespective of the liquid level in the gaging capacitor, alternating-current energizing means connected to said capacitors as two adjoining arms of an alternating current bridge having a potential reference point between oppositely phased portions thereof, current comparing means connected to said capacitors and to said reference point so as to detect bridge unbalance and including an amplifier, means in the bridge but remote from said gaging and sampling capacitors and controlled by said amplifier and effective to maintain a predetermined ratio of the current of said sampling capacitor to the current in the liquid filled portion of said gaging capacitor despite variations in liquid level occurring from time to time, and a high-Q capacitor remote from said gaging and sampling capacitors and being connected to said energizing means and said comparing means and having means ganged to said sampling-capacitor ratio-maintaining means for compensating for the air-capacitive current of the portion of the gaging capacitor exposed above the liquid level.

5. A system for measuring the level of dielectric liquid such as fuel in a tank, including an alternating-current bridge having alternating-current energizing means and unbalance detecting means, a liquid level gaging capacitor having a pair of electrodes spaced from and insulated from each other and adapted to be inserted in a tank with each electrode extending from the minimum to the maximum level of the range of liquid levels to be measured, said gaging capacitor being designed to admit and release liquid readily so as to have the level of liquid therein vary with the liquid level in the tank, a liquid sampling capacitor having a pair of electrodes spaced and insulated from each other and fixed in relation to each other and adapted for insertion in the tank with the gaging capacitor, said sampling capacitor being arranged to have the space between the electrodes thereof filled and to remain filled with the liquid of the tank irrespective of the level of liquid in the tank, said gaging and sampling capacitors being connected in adjoining arms of the bridge, a high-Q capacitor connected in said bridge in a circuit between said energizing means and a point between said adjoining arms of the bridge and having adjustable means for controlling the current thereof, said high-Q capacitor and its adjustable means being adapted to be disposed remote from said gaging and sampling devices, means adapted to be located remote from said gaging and sampling capacitors for adjusting the current of the sampling capacitor as a direct function of the portion of the gaging capacitor occupied by the liquid, said adjustable means of said high-Q capacitor being ganged to said current adjusting means of said sampling capacitor and being effective to adjust the current of said high-Q capacitor to balance the bridge in respect of the current in the exposed portion of the gaging capacitor above the liquid level.

6. A liquid level gaging system, including a liquid level gaging capacitor having a pair of electrodes extending from a low level to a high level in a liquid the level of which is to be gaged and said electrodes being adapted to admit the liquid to the level between the electrodes that prevails about the electrodes, and a liquid sampling capacitor including a pair of electrodes fixed in relation to each other and arranged to have the space therebetween occupied fully by a sample of the liquid to be gaged irrespective of variations in the level of liquid in the gaging capacitor, said capacitors being connected in series and having a common junction, alternating-current energizing means having connections to said series capacitors, said alternating-current energizing means having a reference potential point between the respective connections thereof to said series capacitors, a high-Q capacitive circuit remote from said sampling and gaging capacitors and connected between said junction and the portion of said alternating current energizing means to which said sampling capacitor is connected, said circuit including adjustable means to control the current thereof, and means remote from said gaging and sampling capacitors and including a potentiometer for said sampling capacitor and further including a servo-motor operative in response to the unbalance voltage of said junction relative to said reference potential point for adjusting the current through both said high-Q circuit and said sampling capacitor to eliminate such unbalance voltage, the adjustable current control means of said high-Q capacitive circuit and the potentiometer of the sampling capacitor being ganged together for operation by said servo-motor and being effective to cause the current in the sampling capacitor to be a direct function of the portion of the gaging capacitor occupied by the liquid and being effective to cause the current of the high-Q capacitive circuit to be a direct function of the exposed portion of the gaging capacitor above the liquid.

7. A liquid level gaging bridge, including an alternating-current source embodying a reference point and first and second energizing portions respectively at opposite sides of said reference point, an unbalance detector and a servo-motor controlled thereby for maintaining balance of the bridge automatically, a gaging capacitor in one arm of said bridge and connected to the first of said energizing portions, said gaging capacitor having insulated electrodes extending between minimum and maximum levels of a liquid to be measured and being designed to admit liquid to the same level between the electrodes as that prevailing about the electrodes, and two branch circuits constituting another arm of said bridge and connected to the second of said energizing portions, one of said branch circuits containing a fixed sampling capacitor including a pair of electrodes fixed relative to each other and insulated from each other and adapted to remain filled with the liquid the level of which is to be measured, adjustable current control means for said fixed sampling capacitor adapted to be disposed remote therefrom, another of said branch circuits containing a high-Q capacitor having means adapted to be disposed remote from said gaging and sampling capacitors for adjusting the current of said high-Q capacitor, the adjustable current control means of the sampling capacitor being ganged to the current adjusting means of the high-Q capacitor and connected to said servo-motor for operation thereby in such manner as to decrease the current of said sampling capacitor and to increase the current of said high-Q capacitor as the level of liquid in said gaging capacitor drops and to maintain bridge balance.

8. A liquid level gaging system, including alternating-current energizing means having a reference terminal between two oppositely phased portions thereof, a liquid level gaging capacitor having separate electrodes adapted to extend throughout the range of liquid levels to be measured and having passages enabling equalizing flow of liquid between the interior of the gaging capacitor and the space about this gaging capacitor, a sampling capacitor adapted to be filled with a sample of the liquid in said gaging capacitor, said sampling capacitor including a pair of electrodes insulated apart and fixed in relation to each other, said gaging and sampling capacitors having a junction and having respective connections to said oppositely phased portions of said alternating current energizing means, one of said connections including a potentiometer adjustable to balance the bridge in respect to the component of current in the liquid-filled portion of said gaging capacitor, and an air capacitor connected in a circuit from said junction to said alternating current supply means and having adjustment means to balance the bridge in respect to the component of current in the portion of the gaging capacitor left exposed above the liquid, said adjustment means and said potentiometer and said air capacitor being disposed remote from said gaging and sampling capacitors, bridge unbalance detecting means connected between said reference terminal and said junction, and a common servo-drive connected to said potentiometer and to said adjustment means and effective to operate both properly to maintain bridge balance in response to unbalance at said detecting means.

9. A liquid level gaging system in accordance with claim 8, wherein said air capacitor is connected in a circuit to the portion of said alternating current energizing means at the same side of said reference terminal to which said sampling capacitor is connected.

10. A gage for measuring the quantity of a liquid exhibiting both a dielectric constant and an electrical resistance comprising, a measuring capacitor having spaced electrodes between which said liquid enters to an extent varying with said quantity thereof, a measuring reference capacitor having fixed electrode size and spacing with the interelectrode space thereof normally filled with a sample of the liquid being measured, a low-loss-dielectric capacitor, an impedance providing impedance sections with a conjugate-point tap therebetween, an impedance bridge having said measuring capacitor and one of said impedance sections in a first branch thereof and having the other of said impedance sections included in common with individual ones of said measuring reference and low-loss-dielectric capacitors in respective second and third branches thereof and including first diametric conjugate bridge points adapted to be energized from a source of alternating potential, first adjustable means in said second bridge branch for balancing said bridge with respect to the resistive component and that portion of the capacitive component of current flowing through said measuring capacitor resulting from the liquid filled portion thereof, second adjustable means in said third bridge branch for balancing said bridge with respect to the remainder of the capacitive component of current flowing through said measuring capacitor, means responsive to the magnitude and phase of any unbalance component of bridge energization appearing between second conjugate output points of said bridge for controlling in unison said first and second adjustable means to adjust in opposite senses and to substantial bridge balancing values the magnitudes of currents flowing through said second and said third bridge branches, and indicator means controlled by said last-mentioned means for indicating said quantity of liquid.

11. A gage for measuring the quantity of a liquid exhibiting both a dielectric constant and an electrical resistance comprising, a measuring capacitor having spaced electrodes between which said liquid enters to an extent varying with said quantity thereof, a measuring reference capacitor having fixed electrode size and spacing with the interelectrode space thereof normally filled with a sample of the liquid being measured, a low-loss-dielectric capacitor, an inductor providing winding sections with a conjugate-point tap therebetween, an impedance bridge having said measuring capacitor and one of said winding sections in a first branch thereof and having the other of said winding sections included in common with individual ones of said measuring reference and low-loss-dielectric capacitors in respective second and third branches thereof and including first diametric conjugate bridge points adapted to be energized from a source of alternating potential, first adjustable means in said second bridge brance for balancing said bridge with respect to the resistive component and that portion of the capacitive component of current flowing through said measuring capacitor resulting from the liquid filled portion thereof, second adjustable means in said third bridge branch for balancing said bridge with respect to the remainder of the capacitive component of current flowing through said measuring capacitor, means responsive to the magnitude and phase of any unbalance component of bridge energization appearing between second conjugate output points of said bridge for controlling in unison said first and second adjustable means to adjust in opposite senses and to substantial bridge balancing values the magnitudes of currents flowing through said second and said third bridge branches, and indicator means controlled by said last-mentioned means for indicating said quantity of liquid.

12. A gage for measuring the quantity of a liquid exhibiting both a dielectric constant and an electrical resistance comprising, a measuring capacitor having spaced electrodes between which said liquid enters to an extent varying with said quantity thereof, a measuring reference capacitor having fixed electrode size and spacing with the interelectrode space thereof normally filled with a sample of the liquid being measured, a low-loss-dielectric capacitor, a transformer including a winding having winding sections with a conjugate-point tap therebetween, an impedance bridge having said measuring capacitor and one of said winding sections in a first branch thereof and having the other of said winding sections included in common with individual ones of said measuring reference and low-loss-dielectric capacitors in respective second and third branches thereof and including first diametric conjugate bridge points adapted to be energized from a source of alternating potential, first adjustable means in said second bridge branch for balancing said bridge with respect to the resistive component and that portion of the capacitive component flowing through said measuring capacitor resulting from the liquid filled portion thereof, second adjustable means in said bridge branch for balancing said bridge with respect to the remainder of the capacitive component of current flowing through said measuring capacitor, means responsive to the magnitude and phase of any unbalance component of bridge energization appearing between second conjugate output points of said bridge for controlling in unison said first and second adjustable means to adjust in opposite senses and to substantial bridge balancing values the magnitudes of currents flowing through said second and said third bridge branches, and indicator means controlled by said last-mentioned means for indicating said quantity of liquid.

13. A gage for measuring the quantity of a liquid exhibiting both a dielectric constant and an electrical resistance comprising, a measuring capacitor having spaced electrodes between which said liquid enters to an extent varying with said quantity thereof, a measuring reference capacitor having fixed electrode size and spacing with the interelectrode space thereof normally filled with a sample of the liquid being measured, a low-loss-dielectric capacitor, a transformer including a primary winding adapted to be connected to a source of energizing alternating potential and including a secondary winding having winding sections with a conjugate-point tap therebetween, an impedance bridge having said measuring capacitor and one of said winding sections in a first branch thereof and having the other of said winding sections included in common with individual ones of said measuring reference and low-loss-dielectric capacitors in respective second and third branches thereof, the terminals of said secondary winding remote from said conjugate-point tap providing first diametric conjugate bridge points energized from said source of alternating potential, first adjustable means in said second bridge branch for balancing said bridge with respect to the resistive component and that porton of the capacitive component of current flowing through said measuring capacitor resulting from the liquid filled portion thereof, second adjustable means in said third bridge branch for balancing said bridge with respect to the remainder of the capacitive component of current flowing through said measuring capacitor, means responsive to the magnitude and phase of any unbalance component of bridge energization appearing between said first-mentioned conjugate-point tap and a point of said bridge common to all of said bridge branches for controlling in unison said first and second adjustable means to adjust in opposite senses and to substantial bridge balancing values the magnitudes of currents flowing through said second and third bridge branches, and indicator means controlled by said last-mentioned means for indicating said quantity of liquid.

14. A gage for measuring the quantity of a liquid exhibiting both a dielectric constant and an electrical resistance comprising, a measuring capacitor having spaced electrodes between which said liquid enters to an extent varying with said quantity thereof, a measuring reference capacitor having fixed electrode size and spacing with the interelectrode space thereof normally filled with a sample of the liquid being measured, a low-loss-dielectric capacitor, a transformer including a primary winding having winding sections with a conjugate-point tap therebetween and including a secondary output winding, an impedance bridge having said measuring capacitor and one of said winding sections in a first branch thereof and having the other of said winding sections included in common with individual ones of said measuring reference and low-loss-dielectric capacitors in respective second and third branches thereof and having first diametric conjugate bridge points including said conjugate-point tap adapted to be energized from a source of alternating potential, first adjustable means in said escond bridge branch for balancing said bridge with respect to the resistive component and that portion of the capacitive component of current flowing through said measuring capacitor resulting from the liquid filled portion thereof, second adjustable means in said third bridge branch for balancing said bridge with respect to the remainder of the capacitive component of current flowing through said measuring capacitor, means responsive to the magnitude and phase of any unbalance component of bridge energization appearing in said transformer secondary winding for controlling in unison said first and second adjustable means to adjust in opposite senses and to substantial bridge balancing values the magnitudes of currents flowing through said second and third bridge branches, and indicator means controlled by said last-mentioned means for indicating said quantity of liquid.

15. A gage for measuring the quantity of a liquid exhibiting both a dielectric constant and an electrical resistance comprising, a measuring capacitor having spaced electrodes between which said liquid enters to an extent varying with said quantity thereof, a measuring reference capacitor having fixed electrode size and spacing with the interelectrode space thereof normally filled with a sample of the liquid being measured, a low-loss-dielectric capacitor, an impedance providing impedance sections with a conjugate-point tap therebetween, an impedance bridge having said measuring capacitor and one of said impedance sections in a first branch thereof and having the other of said impedance sections included in common with individual ones of said measuring reference and low-loss-dielectric capacitors in respective second and third branches thereof and including first diametric conjugate bridge points adapted to be energized from a source of alternating potential, an adjustable potential divider in said second bridge branch for balancing said bridge with respect to the resistive component and that portion of the capacitive component of current flowing through said measuring capacitor resulting from the liquid filled portion thereof, adjustable means in said third bridge branch for balancing said bridge with respect to the remainder of the capacitive component of current flowing through said measuring capacitor, means responsive to the magnitude and phase of any unbalance component of bridge energization appearing between second conjugate output points of said bridge for controlling in unison said potential divider and said adjustable means to adjust in opposite senses and to substantial bridge balancing values the magnitudes of currents flowing through said second and third bridge branches, and indicator means controlled by said last-mentioned means for indicating said quantity of liquid.

16. A gage for measuring the quantity of a liquid exhibiting both a dielectric constant and an electrical resistance comprising, a measuring capacitor having spaced electrodes between which said liquid enters to an extent varying with said quantity thereof, a measuring reference capacitor having fixed electrode size and spacing with the interelectrode space thereof normally filled with a sample of the liquid being measured, an adjustable low-loss-dielectric capacitor, an impedance providing impedance sections with a conjugate-point tap therebetween, an impedance bridge having said measuring capacitor and one of said impedance sections in a first branch thereof and having the other of said impedance sections included in common with individual ones of said measuring reference and low-loss-dielectric capacitors in respective second and third branches thereof and including first diametric conjugate bridge points adapted to be energized from a source of alternating potential, an adjustable potential divider in said second bridge branch for balancing said bridge with respect to the resistive component and that portion of the capacitive component of current flowing through said measuring capacitor resulting from the liquid filled portion thereof, adjustment of said adjustable capacitor in said third bridge branch being effective to balance said bridge with respect to the remainder of the capacitive component of current flowing through said measuring capacitor, means responsive to the magnitude and phase of any unbalance component of bridge energization appearing between second conjugate output points of said bridge for controlling in unison said potential divider and said adjustable capacitor to adjust in opposite senses and to substantial bridge balancing values the magnitudes of currents flowing through said second and third bridge branches, and indicator means controlled by said last-mentioned means for indicating said quantity of liquid.

17. A gage for measuring the quantity of a liquid exhibiting both a dielectric constant and an electrical resistance comprising, a measuring capacitor having spaced electrodes between which said liquid enters to an extent varying with said quantity thereof, a measuring reference capacitor having fixed electrode size and spacing with the interelectrode space thereof normally filled with a sample of the liquid being measured, a low-loss-dielectric capacitor of fixed value, an impedance providing impedance sections with a conjugate-point tap therebetween, an impedance bridge having said measuring capacitor and one of said impedance sections in a first branch thereof and having the other of said impedance sections included in common with individual ones of said measuring reference and low-loss-dielectric capacitors in respective second and third branches thereof and including first diametric conjugate bridge points adapted to be energized from a source of alternating potential, an adjustable potential divider in said second bridge branch for balancing siad bridge with respect to the resistive component and that portion of the capacitive component of current flowing through said measuring capacitor resulting from the liquid filled portion thereof, an adjustable potential divider in said third bridge branch for balancing said bridge with respect to the remainder of the capacitive component of current flowing through said measuring capacitor, means responsive to the magnitude and phase of any unbalance component of bridge energization appearing between second conjugate output points of said bridge for controlling in unison said potential dividers to adjust in opposite senses and to substantial bridge balancing values the magnitudes of currents flowing through said second and third bridge branches, and indicator means controlled by said last-mentioned means for indicating said quantity of liquid.

18. A gage for measuring the quantity of a liquid exhibiting both a dielectric constant and an electrical resistance comprising, a measuring capacitor having spaced electrodes between which said liquid enters to an extent varying with said quantity thereof, a measuring reference capacitor having fixed electrode size and spacing with the interelectrode space thereof normally filled with a sample of the liquid being measured, a transformer including a primary winding adapted to be connected to a source of energizing alternating potential and including a secondary winding having winding sections with a conjugate-point tap therebetween, an impedance bridge having said measuring capacitor and one of said winding sections in a first branch thereof and having the other of said winding sections included in common with individual ones of said measuring reference and low-loss-dielectric capacitors in respective second and third branches thereof, the terminals of said secondary winding remote from said conjugate-point tap providing first diametric conjugate bridge points energized from said source of alternating potential, an adjustable potential divider connected across said other secondary winding section and included in said second bridge branch for balancing said bridge with respect to the resistive component and that portion of the capacitive component of current flowing through said measuring capacitor resulting from the liquid filled portion thereof, adjustable means in said third bridge branch for balancing said bridge with respect to the remainder of the capacitive component of current flowing through said measuring capacitor, means responsive to the magnitude and phase of any unbalance component of bridge energization appearing between second conjugate to output points of said bridge for controlling in unison said potential divider and said adjustable means to adjust in opposite senses and to substantial bridge balancing values the magnitudes of current flowing through said second and third bridge branches, and indicator means controlled by said last-mentioned means for indicating said quantity of liquid.

19. A gage for measuring the quantity of a liquid exhibiting both a dielectric constant and an electrical resistance comprising, a measuring capacitor having spaced electrodes between which said liquid enters to an extent varying with said quantity thereof, a measuring reference capacitor having fixed electrode size and spacing with the interelectrode space thereof normally filled with a sample of the liquid being measured, a low-loss-dielectric capacitor, a transformer including a primary winding adapted to be connected to a source of energizing alternating potential and including a secondary winding having winding sections with a conjugate-point tap therebetween, an impedance bridge having said measuring capacitor and one of said winding sections in a first branch thereof and having the other of said winding sections included in common with individual ones of said measuring reference and low-loss-dielectric capacitors in respective second and third branches thereof, the terminals of said secondary winding remote from said conjugate-point tap providing first diametric conjugate bridge points energized from said source of alternating potential, an adjustable potential divider connected across said other secondary winding section and included in said second bridge branch for balancing said bridge with respect to the resistive component and that portion of the capacitive component of current flowing through said measuring capacitor resulting from the liquid filled portion thereof, an adjustable potential divider connected across said other secondary winding section and included in said third bridge branch for balancing said bridge with respect to the remainder of the capacitive component of current flowing through said measuring capacitor, means responsive to the magnitude and phase of any unbalance component of bridge energization appearing between said conjugate-point tap and a point of said bridge common to all of said branches for controlling in unison said potential dividers to adjust in opposite senses and to substantial bridge balance values the magnitudes of currents flowing through said second and third bridge branches, and indicator means controlled by said last-mentioned means for indicating said quantity of liquid.

References Cited in the file of this patent

UNITED STATES PATENTS

| | | |
|---|---|---|
| 2,188,628 | Freystedt | Jan. 30, 1940 |
| 2,357,023 | Reid et al. | Aug. 29, 1944 |
| 2,511,398 | DeGiers et al. | June 13, 1950 |
| 2,541,743 | Brockman et al. | Feb. 13, 1951 |
| 2,581,085 | Edelman | Jan. 1, 1952 |
| 2,622,442 | DeBoisblanc et al. | Dec. 23, 1952 |

OTHER REFERENCES

Electronics, vol. 23, April 1950, pp. 77–79.

UNITED STATES PATENT OFFICE
CERTIFICATE OF CORRECTION

Patent No. 2,867,120            January 6, 1959

Curtiss R. Schafer

It is hereby certified that error appears in the printed specification of the above numbered patent requiring correction and that the said Letters Patent should read as corrected below.

Column 3, line 29, for "unt 24" read -- unit 24 --; column 6, line 19, for "298" read -- 208 --; column 11, line 19, for "brance" read -- branch --; column 12, line 53, for "escond" read -- second --; column 14, line 58, after "conjugate" strike out "to".

Signed and sealed this 21st day of April 1959.

(SEAL)
Attest:

KARL H. AXLINE            ROBERT C. WATSON
Attesting Officer            Commissioner of Patents